United States Patent
Lin (12)

(10) Patent No.: US 6,304,440 B1
(45) Date of Patent: Oct. 16, 2001

(54) SHOCK-PROOF DEVICE OF EXTERNAL HARD DISK DRIVER BOX

(76) Inventor: Liken Lin, 35, Chung-Yang Rd., Sec. 4, Tu-Cheng City, Taipei Hsien (TW)

( * ) Notice: Subject to any disclaimer, the term of this patent is extended or adjusted under 35 U.S.C. 154(b) by 0 days.

(21) Appl. No.: 09/433,584

(22) Filed: Nov. 4, 1999

(51) Int. Cl.[7] .................................................. G06F 1/16
(52) U.S. Cl. ........................ 361/685; 361/686; 248/581; 364/708.1
(58) Field of Search ................................... 361/685, 686, 361/687, 683; 174/117 FF, 72 TR, 250; 248/60, 581, 609, 611, 615, 634, 635, 638; 360/97.01, 137; 364/708.1

(56) References Cited

U.S. PATENT DOCUMENTS

| | | | |
|---|---|---|---|
| 5,264,992 | * 11/1993 | Hogdahl et al. | 361/686 |
| 5,277,615 | * 1/1994 | Hastings et al. | 439/377 |
| 5,439,394 | * 8/1995 | Ikeda | 439/675 |
| 5,568,357 | * 10/1996 | Kochis et al. | 361/681 |
| 5,654,874 | * 8/1997 | Suzuki | 361/685 |
| 5,668,697 | * 9/1997 | Dowdy | 361/685 |

* cited by examiner

*Primary Examiner*—Leo P. Picard
*Assistant Examiner*—Hung Van Duong
(74) *Attorney, Agent, or Firm*—Jacobson Holman, PLLC

(57) ABSTRACT

A shock-proof device of an external hard disk driver box suitable for personal computer or notebook computer is disclosed. The shock-proof device has a high capacity memory which is replaceable as pleasure. The damage of hard disk within the shock-proof device of the present invention due to shock and vibration can be prevented and the hard disk will not be destroyed. A shock-proof device of an external hard disk driver box comprises an upper cover, a hard disk and a seat. The hard disk is placed in the seat and is connected to the connecting ports and power receptacle at the rear edge of the seat by a signal bank wire and a power wire for being used externally. The periphery of the hard disk is installed with fixing block and the upper and lower surfaces of the hard disk and fixing block are disposed with a plurality of soft protecting pads.

3 Claims, 5 Drawing Sheets

SHOCK-PROOF DEVICE OF EXTERNAL HARD DISK DRIVER BOX

FIELD OF THE INVENTION

The present invention relates to a shock-proof device of an external hard disk driver box suitable for personal computer or notebook computer. The damage of hard disk within the shockproof device of the present invention due to shock and vibration can be prevented and the hard disk will not be destroyed.

BACKGROUND OF THE INVENTION

As shown in FIG. 3, a prior art hard disk driver is illustrated. A hard disk A2 and a header A3 are installed in a hard disk A. In general, as it is not used, the hard disk A2 is in a still condition. The header A3 stops on the hard disk piece A2 and steadily located thereon. When using the hard disk driver, the motor within the hard disk A will drive the hard disk piece A2 to rotate with a high speed. By the high speed rotation of the hard disk piece A2, an air flow is formed within the hard disk A. The air flow causes the header A3 to float away from the surface of the hard disk piece A2. By magnetic induction, the data recorded on the hard disk piece A2 is converted into signals by the header A3, and then the signal is transferred to a memory or arithmetic operator. Therefore, as the hard disk piece A2 is operated, it the hard disk A shocks or vibrates, the float of the header A will be interrupted or even be destroyed. Therefore, it is possible that the header A3 impacts or contacts the surface of the hard disk piece A2 so as to induce that the surface of the hard disk piece A2 is scraped or destroyed. Thus, the data recorded on the area can not be read or written again.

Furthermore, as the structure of the prior art external hard disk driver box shown in FIGS. 4 and 5, the hard disk driver is formed by a hard disk A, a seat B and an upper cover C. The hard disk A is placed within the seat B. The connecting port B1 of the hard disk A and the connecting port B2 of the seat B are connected by a signal bank wire A11 respectively. The power connecting portion at the left side of the connecting port B1 is connected to a power receptacle at the rear edge of seat B, and then the upper cover C covers the seat B. However, the general external hard disk driver box has no protection to the hard disk A within the box so as to prevent a shock or vibration. Consequently, such kind of hard disk driver is only located motionless. It can not be carried out as desired.

SUMMARY OF THE INVENTION

Accordingly, the primary object of the present invention is to provide a shock-proof device of an external hard disk driver box suitable for personal computer or notebook computer. The shock-proof device has a high capacity memory which is replaceable as pleasure. The damage of hard disk within the shock-proof device of the present invention due to shock and vibration can be prevented and the hard disk will not be destroyed. A shock-proof device of an external hard disk driver box comprises an upper cover, a hard disk and a seat. The hard disk is placed in the seat and is connected to the connecting ports and power receptacle at the rear edge of the seat by a signal bank wire and a power wire for being used externally. The periphery of the hard disk is installed with fixing block and the upper and lower surfaces of the hard disk and fixing block are disposed with a plurality of soft protecting pads.

The various objects and advantages of the present invention will be more readily understood from the following detailed description when read in conjunction with the appended drawing.

DETAILED DESCRIPTION OF THE PREFERRED EMBODIMENTS

Figure 1:
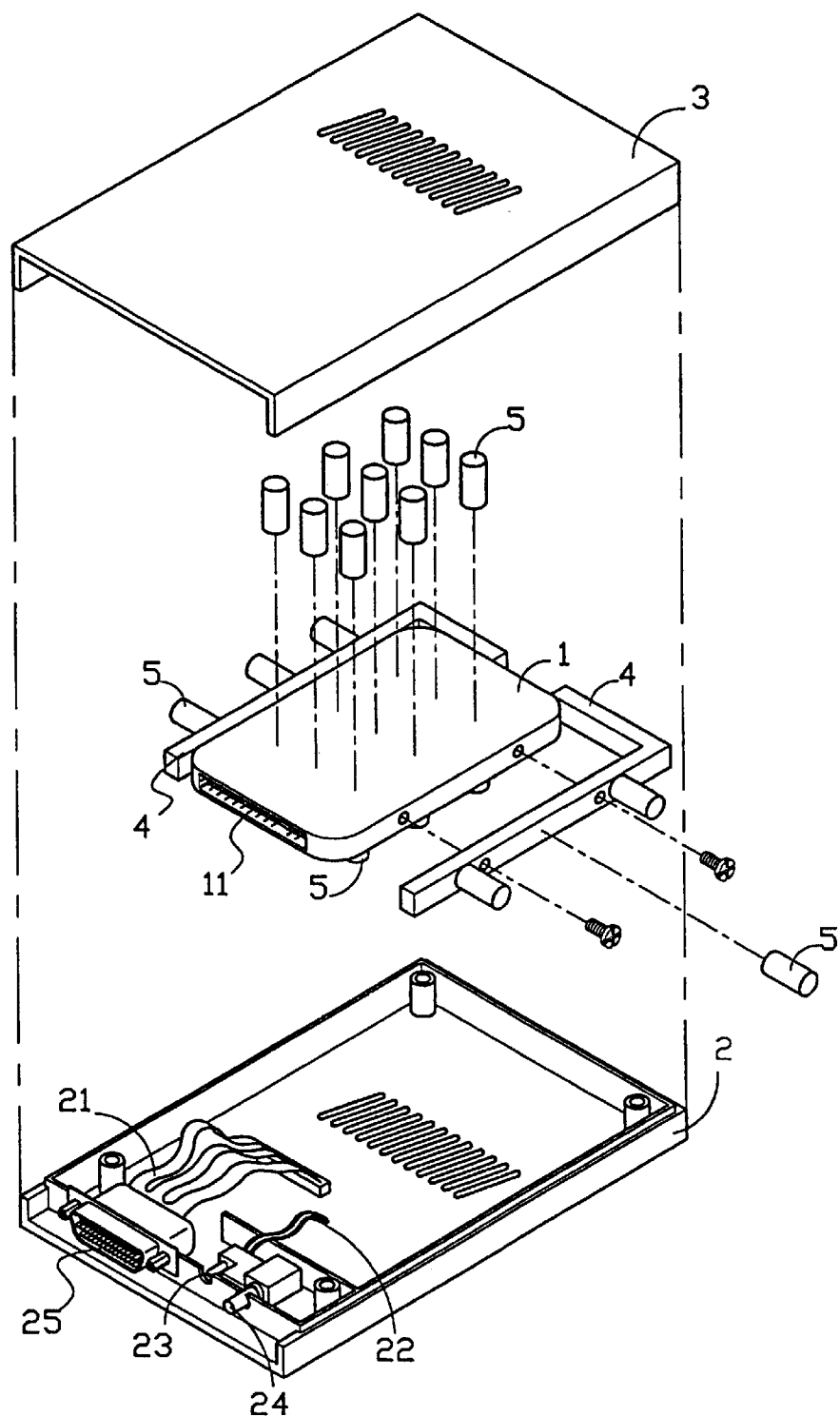
FIG. 1 is an exploded perspective view of the present invention.
Figure 2:
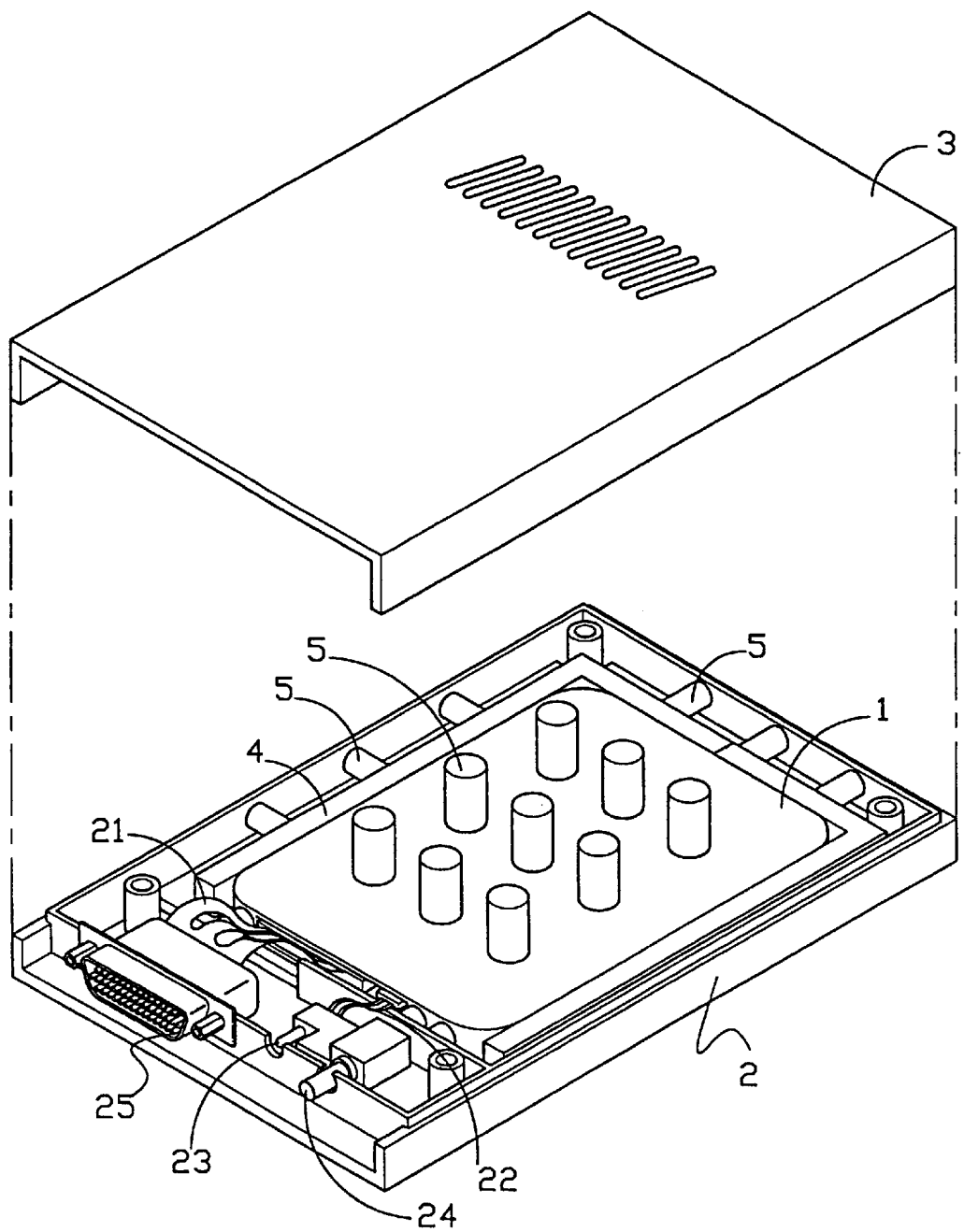
FIG. 2 is an assembled schematic view of the present invention.
Figure 3:
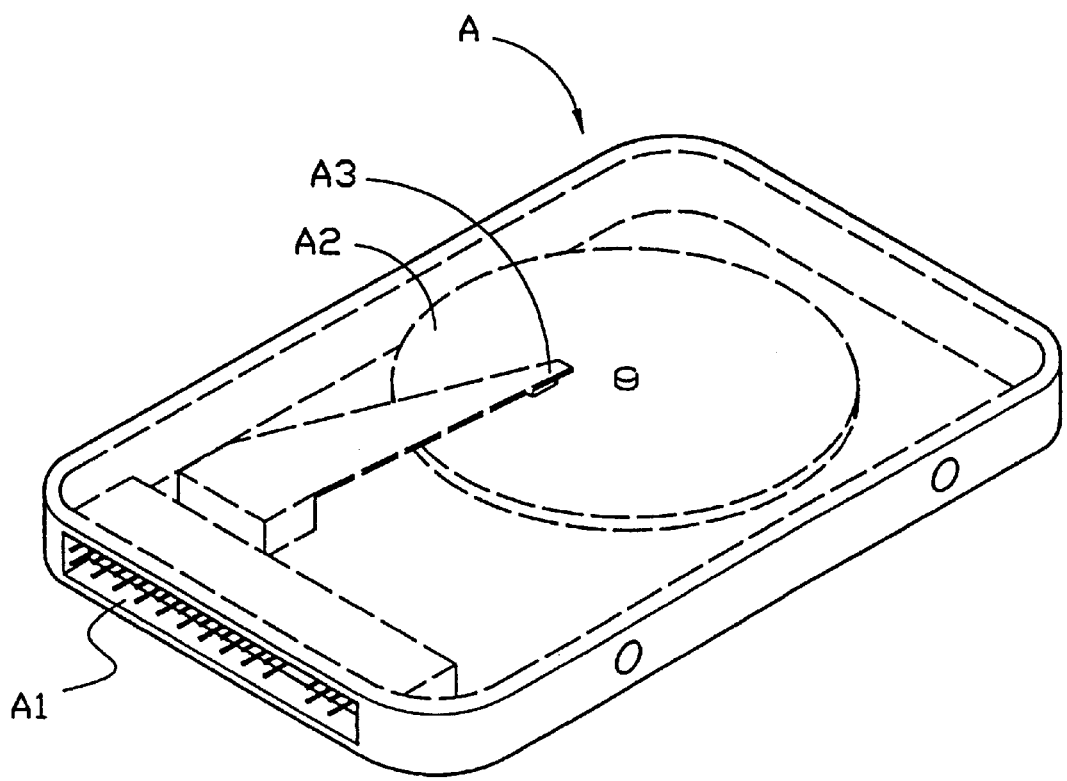
FIG. 3 is a structural schematic view showing a prior art hard disk driver.
Figure 4:
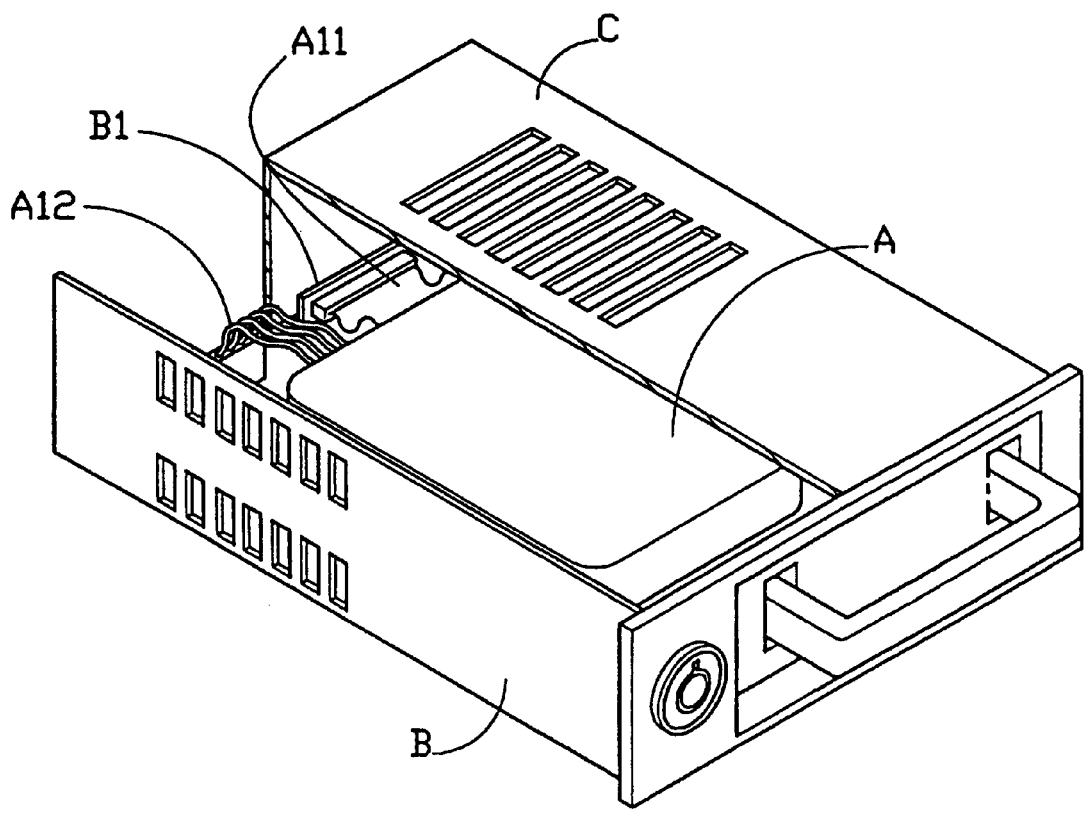
FIG. 4 is a partial cross sectional view schematically showing a prior art external hard disk driver.
Figure 5:
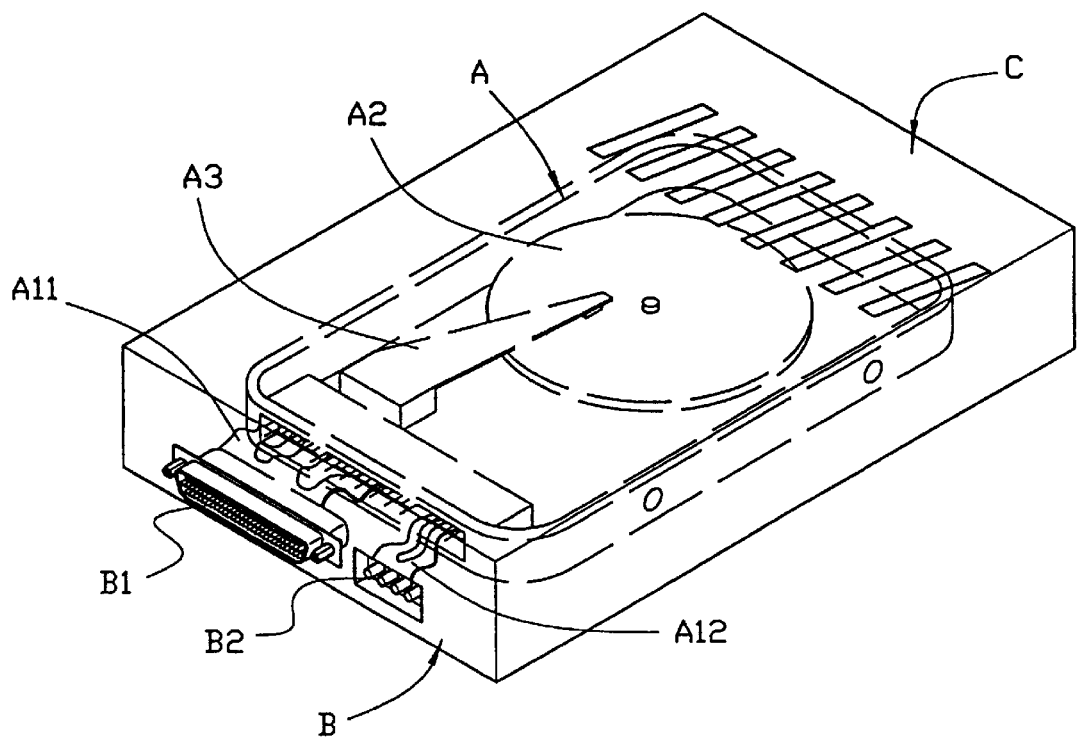
FIG. 5 is a perspective view showing the back side view of a prior art external hard disk driver.

As shown in FIGS. 1 and 2, the present invention includes a hard disk 1, a seat 2, and an upper cover 3. The periphery of the hard disk 1 is installed with fixing block 4. The outer periphery of the fixing block 4 and the upper and lower surfaces of the hard disk 1 are installed with a plurality of soft protecting pads 5. Soft circuit board 21 and power wire 22 are connected between the connecting port 11 of the hard disk 1, the connecting port 25 of the seat 2, and the power receptacle 23. By such a structure, the shock and vibration suffered by the hard disk 1 in the external hard disk driver box are reduced.

In the aforesaid structure, since the upper and lower surfaces of the hard disk 1 of the present invention are installed with soft protecting pads 5, it has the function of absorbing shock, even the damage from shock can be prevented. Moreover, since in the present invention, the side of the hard disk 1 is arranged with a fixing block 4, the moving range of the hard disk 1 within the external hard disk driver box is confined. Furthermore, since soft protecting pads 5 are mounted at the outer sides of the fixing block 4, therefore, the impact and shock from the lateral side of the hard disk can be reduced. Therefore, the stability of the hard disk is increased and the damage from shock is prevented.

Besides, in the present invention, the soft circuit board 21 and power wire 22 are used as electric connection between the hard disk 1 and the seat 2. Since the soft circuit board and the wire have preferred softness and flexibility. Therefore, as the hard disk 1 is shocked or vibrated, the displacement caused from the structure of the soft circuit board to the shock is small. As a result, signals can be continuously and steadily transferred to a memory or a calculator.

Furthermore, with reference to FIG. 2, in this embodiment, a coaxial cable receptacle 23 is disposed at the rear edge of the seat 2. While another side thereof is installed with a power switch 24. Thus, the hard disk driver of the present invention may use power out of a computer as the power source of operating power.

In summary, in the structure of the present invention, the fixing block 4 and the soft protecting pads 5 at the periphery thereof serves as protection and confinement so that the moving range of the hard disk 1 in the seat 2 of the external hard disk driver box is reduced. Furthermore, the soft protecting pads 5 serves to protect the upper and lower surfaces of the hard disk 1 for reducing the effect from the vertical vibration.

Although the present invention has been described with reference to the preferred embodiments, it will be understood that the invention is not limited to the details described thereof. Various substitutions and modifications have been suggested in the foregoing description, and others will occur to those of ordinary skill in the art. Therefore, all such substitutions and modifications are intended to be embraced within the scope of the invention as defined in the appended claims.

What is claimed is:

1. A shock-proof device of an external hard disk driver box comprising an upper cover, a hard disk having two ends, two sides, an upper surface and a lower surface, and a seat, the hard disk being located between the seat and the upper cover, one of said two ends of said hard disk including a connecting port, said connecting port of said hard disk being connected to a connecting port of said seat by a soft, flexible circuit board, a periphery of the hard disk, being covered on said two sides and the other of said two ends by a fixing block, and at least three soft protecting pads projecting from each of the upper and lower surfaces of the hard disk towards and engaging with the upper cover and the seat, respectively, and at least three of said soft protecting pads project from the fixing block on each of the two sides and the other end of the hard disk to engage said seat.

2. The shock-proof device of an external hard disk driver box as claimed in claim 1, wherein a power receptacle at a rear edge of the seat is a coaxial receptacle.

3. The shock-proof device of an external hard disk driver box as claimed in claim 1, wherein a power receptacle at a rear edge of the seat is disposed with a power switch for controlling operating power.

* * * * *